(12) United States Patent
Signes et al.

(10) Patent No.: US 6,204,854 B1
(45) Date of Patent: Mar. 20, 2001

(54) METHOD AND SYSTEM FOR ENCODING ROTATIONS AND NORMALS IN 3D GENERATED SCENES

(75) Inventors: Julien Signes, San Francisco, CA (US); Olivier Ondet, Paris (FR)

(73) Assignee: France Telecom, Issy Moulineaux (FR)

( * ) Notice: Subject to any disclaimer, the term of this patent is extended or adjusted under 35 U.S.C. 154(b) by 0 days.

(21) Appl. No.: 09/205,190

(22) Filed: Dec. 4, 1998

(51) Int. Cl.$^7$ .................................................. G06F 15/00
(52) U.S. Cl. ............................................................ 345/427
(58) Field of Search ................................ 345/419, 425, 345/427, 441, 132, 135

(56) References Cited

U.S. PATENT DOCUMENTS

| | | | |
|---|---|---|---|
| 5,307,449 | * 4/1994 | Kelley et al. | 345/419 |
| 5,440,682 | 8/1995 | Deering | 395/162 |
| 5,736,987 | 4/1998 | Drucker et al. | 345/420 |
| 5,761,401 | * 6/1998 | Kobayashi et al. | 345/430 |
| 5,793,371 | 8/1998 | Deering | 345/418 |

* cited by examiner

*Primary Examiner*—Phu K. Nguyen
(74) *Attorney, Agent, or Firm*—Oblon, Spivak, McClelland, Maier & Neustadt, P.C.

(57) ABSTRACT

A method and system for encoding a video stream using a compact representation for rotations and normals. The method and system convert rotations and normals into normalized rotations and normals and then project the normalized versions onto a unit cube. Each rotation and normal is encoded according to on which face it was projected. In addition, motion can be compactly represented by movement across the unit cube.

6 Claims, 5 Drawing Sheets

Initial data : 128 bits for each rotation

Quantization on 8 bits : 27 bits for each rotation

Predictive encoding on 4 bits :
27 bits for the first rotation + 12 bits for each following rotation

METHOD AND SYSTEM FOR ENCODING ROTATIONS AND NORMALS IN 3D GENERATED SCENES

CROSS-REFERENCE TO RELATED APPLICATIONS

The present application is related to the co-pending application entitled "Method and System for Predictive Encoding of Arrays of Data," attorney docket number 2167-0106-2, serial number 09/205,191, filed on even date herewith, also naming Julien Signes and Olivier Ondet as inventors. The contents of that co-pending application are incorporated herein by reference.

BACKGROUND OF THE INVENTION

1. Field of the Invention

The present invention relates to the encoding of computer-generated images, and more particularly to the encoding of 3D scenes utilizing 3D rotations and 3D normals.

2. Discussion of the Background

The phrase "computer-generated images" encompasses an expanding area of video technology. Originally the term was often equated with simple text images or 2D images; however, the phrase now encompasses any type of digitally encoded video stream. The Motion Pictures Expert Group (MPEG) was formed to investigate the technologies required for the encoding and decoding of image streams. The resulting standard (now referred to as "MPEG-1") has served as a basis for two additional MPEG standards: MPEG-2 and MPEG-4. MPEG-4 is a standard that is "in progress" and forms the basis for the present invention. The final committee drafts are ISO/IEC FCD 14496-1 MPEG-4 Systems and -2 MPEG-4 Visual, the contents of the final committee drafts are incorporated herein by reference.

The draft standard departs from the single stream-based model of video and raises the focus to a series of streams that act in concert. One portion of the standard is the Binary Format for Scenes (also known as "BIFS"). This format allows the description of 3D objects and their motion and provides the ability for greater interaction with that portion of the video stream. The draft standard, however, does not directly provide a topologically coherent quantization scheme that supports a compensation process.

The representation of rotations with quaternions is known to be used in 3D computing, but not in the context used in the present invention. One known use is in the Cosmo viewer in which quaternions are used internally to interpolate between two rotations to avoid rendering artifacts.

SUMMARY OF THE INVENTION

Not yet available in the BIFS portion of the standard is the ability to efficiently calculate, store and decode rotations and normals. Thus, it is an object of the present invention to address this deficiency.

It is another object of the present invention to provide a computer-implemented method and system for more efficiently encoding rotations in a computer-generated image stream.

It is a further object of the present invention to provide a computer-implemented method and system for more efficiently encoding normals in a computer-generated image stream.

This and other objects of the present invention are addressed by one or more of (1) a computer-implemented method for encoding rotations and normals, (2) a system for encoding rotations and normals, and (3) a computer program product for encoding rotations and normals. Such a system is applicable to improved storage and playback of games, virtual reality environments, and movies. Moreover, based on the improved efficiency, video streams encoded according to the present invention may be played back over lower bandwidth communications links than less efficiently encoded streams.

BRIEF DESCRIPTION OF THE DRAWINGS

A more complete appreciation of the invention and many of the attendant advantages thereof will become readily apparent with reference to the following detailed description, particularly when considered in conjunction with the accompanying drawings, in which.

DESCRIPTION OF THE PREFERRED EMBODIMENTS

Figure 1:
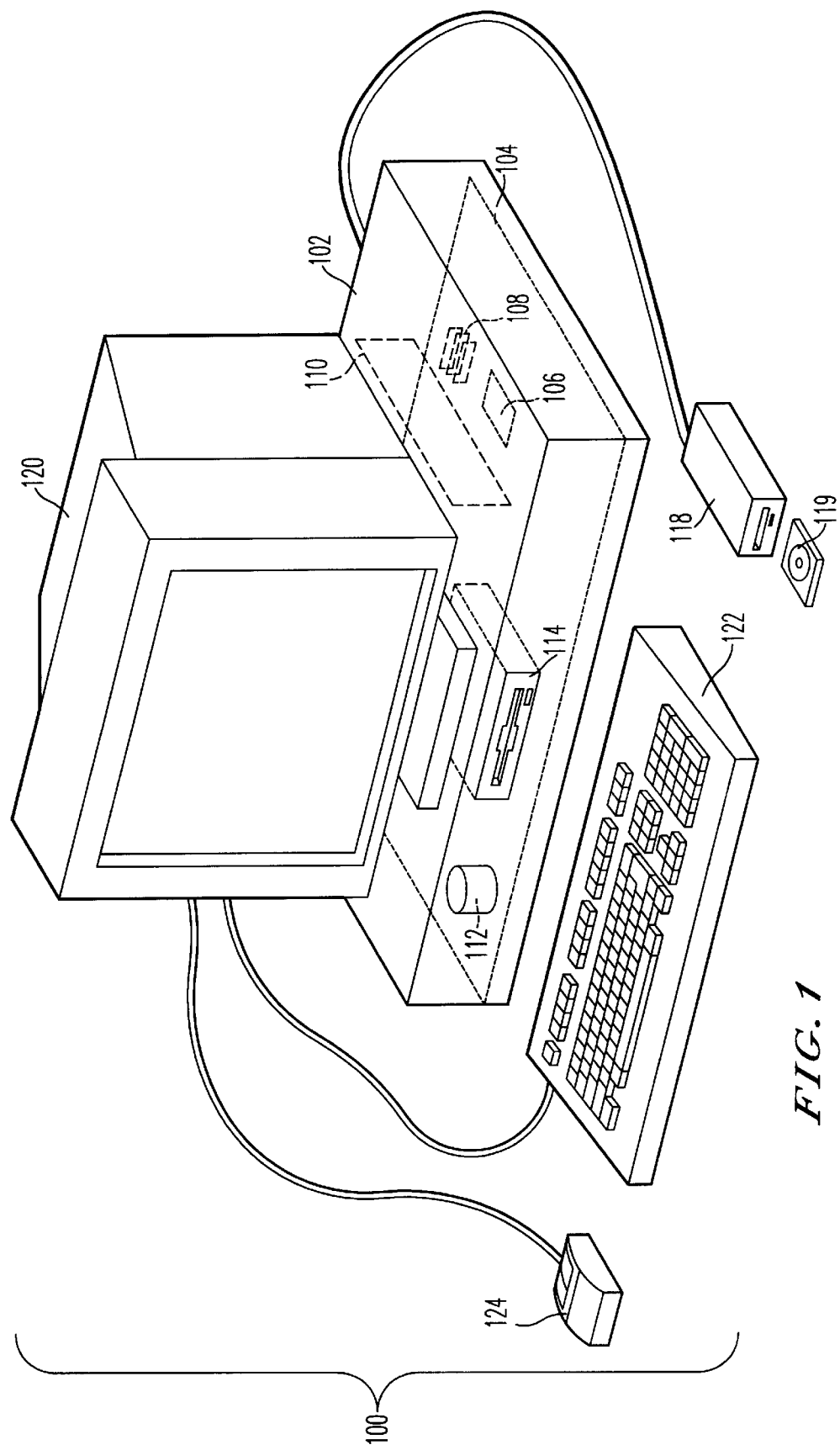
FIG. 1 is a schematic illustration of a computer for providing encoding and/or decoding services of the present invention.

Referring now to the drawings, wherein like reference numerals designate identical or corresponding parts throughout the several views, FIG. 1 is a schematic illustration of a computer system for encoding and/or decoding rotations and/or normals in scene descriptions and/or animations. A computer 100 implements the method of the present invention, wherein the computer housing 102 houses a motherboard 104 which contains a CPU 106, memory 108 (e.g., DRAM, ROM, EPROM, EEPROM, SRAM, SDRAM, and Flash RAM), and other optional special purpose logic devices (e.g., ASICs) or configurable logic devices (e.g., GAL and reprogrammable FPGA). The computer 100 also includes plural input devices, (e.g., a keyboard 122 and mouse 124), and a display card 110 for controlling monitor 120. In addition, the computer system 100 further includes a floppy disk drive 114; other removable media devices (e.g., compact disc 119, tape, and removable magneto-optical media (not shown)); and a hard disk 112, or other fixed, high density media drives, connected using an appropriate device bus (e.g., a SCSI bus, an Enhanced IDE bus, or a Ultra DMA bus). Also connected to the same device bus or another device bus, the computer 100 may additionally include a compact disc reader 118, a compact disc reader/writer unit (not shown) or a compact disc jukebox (not shown). Although compact disc 119 is shown in a CD caddy, the compact disc 119 can be inserted directly into CD-ROM drives which do not require caddies. In addition, a printer (not shown) also provides printed listings of encoded and/or decoded rotations and/or normals.

As stated above, the system includes at least one computer readable medium. Examples of computer readable media are compact discs 119, hard disks 112, floppy disks, tape, magneto-optical disks, PROMs (EPROM, EEPROM, Flash EPROM), DRAM, SRAM, SDRAM, etc. Stored on any one or on a combination of computer readable media, the present invention includes software for controlling both the hardware of the computer 100 and for enabling the computer 100 to interact with a human user. Such software may include, but is not limited to, device drivers, operating systems and user applications, such as development tools. Such computer readable media further includes the computer program product of the present invention for encoding and/or decoding normals and/or rotations in scene descriptions and/or animations. The computer code mechanisms/devices of the present invention can be any interpreted or executable code mechanism, including but not limited to scripts, interpreters, dynamic link libraries, Java classes, and complete executable programs.

Figure 2:
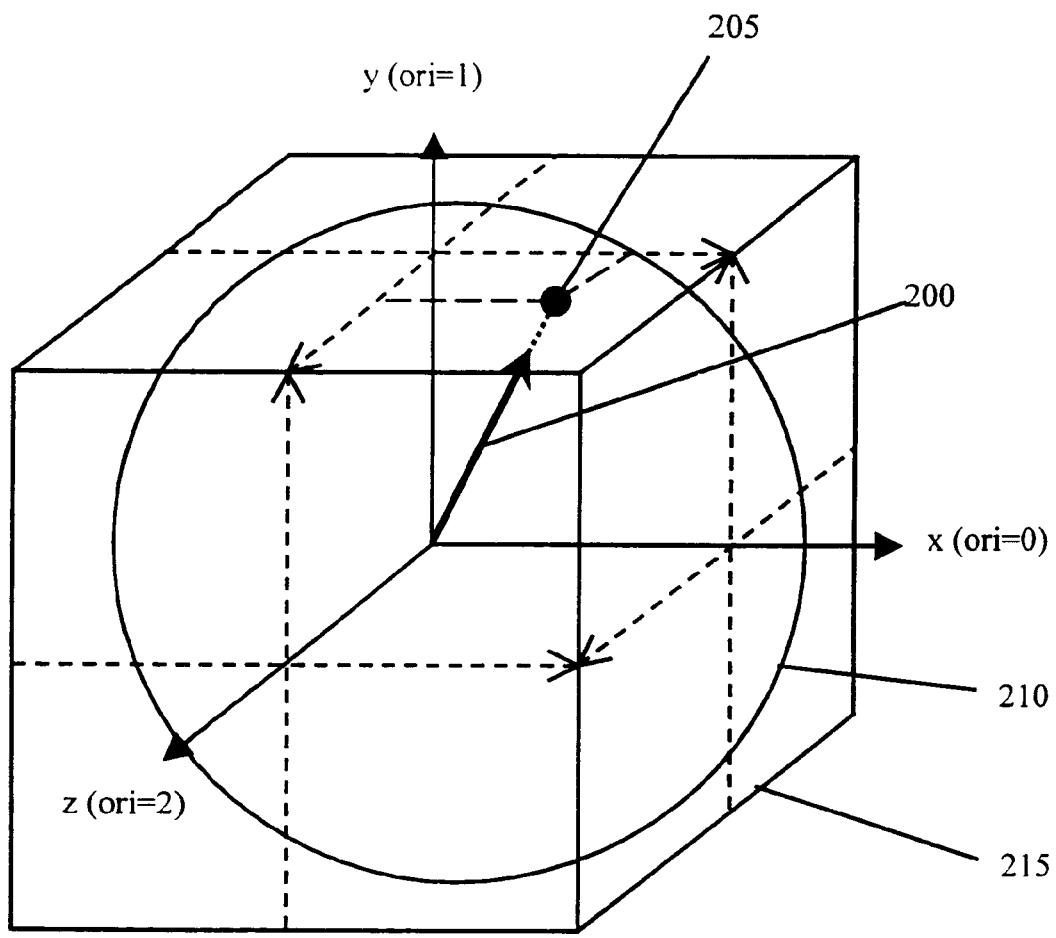
FIG. 2 is an illustration of a unit sphere surrounded by a unit cube onto which normals are projected.

As shown in FIG. 2, the method of the present invention is based on a quantization process that maps normals and rotations onto a "unit" cube surrounding the unit sphere. The process enables the decoder to reconstruct the normals and rotations. Post-processing (e.g., interpolation, analog filtering and reconstruction) can be performed separately. For example, a normal 200, that is initially represented by a 3-dimensional unit vector, is projected as a 3D unit vector on the 3D unit sphere 210. (A rotation, that is initially represented as a 3-dimensional unit vector (for its axis) with an additional angle, gets converted into a quaternion—i.e., a 4D unit vector on the 4D unit sphere.)

The normal 200 is then quantized by intersecting the normal 200 with a face of the surrounding "unit" cube 215, which yields a point on a particular face (i.e., the positive y face in the example) of the "unit" cube 215. Thus, the normal can be "compressed" by converting the 3-dimensional vector into (1) the location (+1, +2) of the point 205, (2) an orientation (e.g., 0 for x-axis, 1 for y-axis, and 2 for z-axis) of on which axis the point 205 is located, and (3) a direction (e.g., +1 or −1) of the unit vector. (The same process can be performed for a rotation, except that the direction need not be stored since the quaternions that lie in opposite directions on the unit sphere represent equivalent rotations.) FIG. 2 is shown using 3 bits per component on the face.

Once a normal 200 (or rotation) has been quantized, movement of the point 205 between frames in the video stream can be encoded using the topological coherence that the cubic mapping provides. In its simplest form, a compensation vector describes the movement on the present face of the point 205. However, a point 205 may also move to a different face between frames. In this case, the face index used in the quantization process enables computation of the new location.

Figure 3:
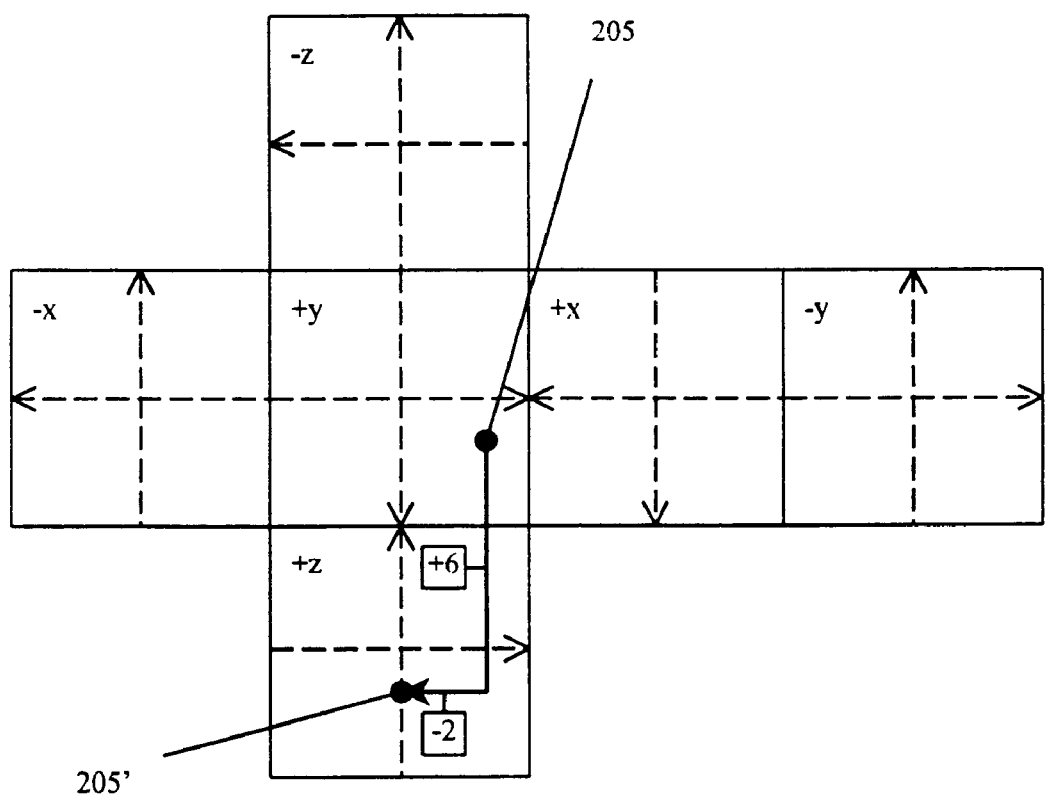
FIG. 3 is an illustration of the unit cube of FIG. 2 unfolded to show the movement from the original point 205 to a new point 205'.
Figure 4:
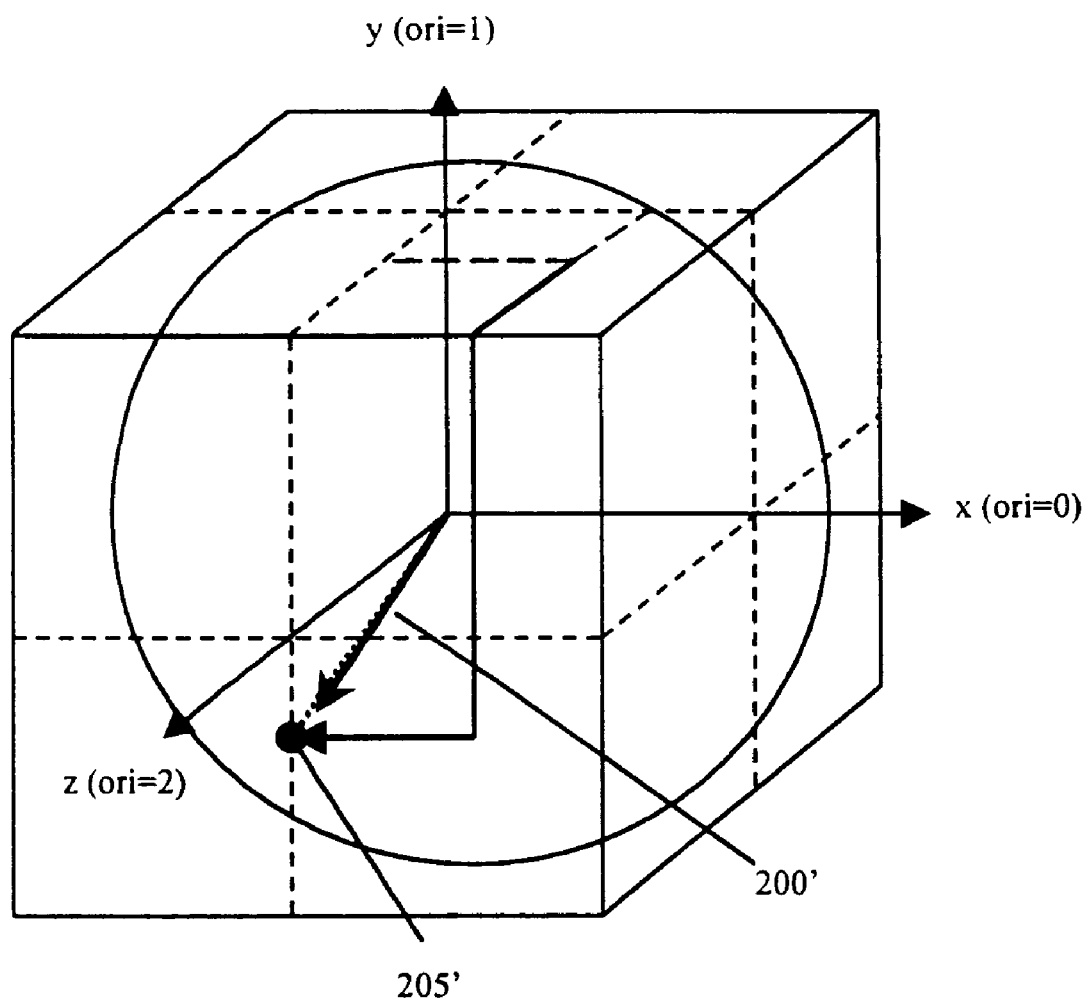
FIG. 4 is an illustration of the point 205' on the unit cube of FIG. 2.

Movement of the point 205 is described in relation to FIG. 3. In FIG. 3, the cube of FIG. 2 has been unfolded. Each of the faces is appropriately labeled in their upper left corners. The original point 205 is to be moved according to vDelta= [+6, −2] and Inverse=+1. FIG. 3 shows on the unfolded cube how the original point 205 moves to become a new point 205'. Likewise, FIG. 4 shows the same motion and the result on the original cube of FIG. 2. As can be seen in FIG. 4, the orientation has changed from the y-axis (ori=1) to the z-axis (ori=2), and the normal 200' points to the new location. The direction, however, has remained +1. Interestingly, to flip from the +y face to its opposite face (i.e., the −y face), movement can be encoded by "jumping" to that face directly by inverting the direction of the previous point by using the direction bit. Therefore, long movements around the surface of the cube can be avoided by starting on an opposite face.

Although an example is provided above of movement of a point between frames, the method may be generalized as described below. Each normal is renormalized to the cube according to:

$$v[0] = \frac{n_x}{\sqrt{n_x^2 + n_y^2 + n_z^2}}, v[1] = \frac{n_y}{\sqrt{n_x^2 + n_y^2 + n_z^2}}, v[2] = \frac{n_z}{\sqrt{n_x^2 + n_y^2 + n_z^2}}$$

Rotations (axis $$\rho$$
$$n,$$

angle α) are written as quaternions according to:

$$v[0] = \cos\left(\frac{a}{2}\right) \; v[1] = \frac{n_x}{\left\|\frac{\rho}{n}\right\|} \cdot \sin\left(\frac{a}{2}\right) \; v[2] = \frac{n_y}{\left\|\frac{\rho}{n}\right\|} \cdot \sin\left(\frac{a}{2}\right) \; v[3] = \frac{n_z}{\left\|\frac{\rho}{n}\right\|} \cdot \sin\left(\frac{a}{2}\right)$$

The normals are rotations are reduced into component form. The number of reduced components is defined to be N, where N=2 for normals, and N=3 for rotations. Accordingly, the dimension of v is then N+1. The compression and quantization process is the same for both normals and rotations and includes determining (1) the orientation, (2) the direction, and (3) the components of each normal or rotation. The orientation, k, of the unit vector v is the index i (where i is in the range of 0 to N), whose component has the largest absolute value (i.e., |v[i]|). This integer is encoded using two bits. Having found k, the direction, dir, (where dir =1 or −1) of the unit vector v is determined by using the sign of the component v[k]. As discussed above, this value is not written for rotations (because of the properties of quaternions).

The N components of the compressed vector are computed by mapping the square on the unit sphere $$\left\{ v \;\middle|\; 0 \le \frac{v[i]}{v[k]} \le 1 \right\}$$

into a N dimensional square according to:

$$v_c[i] = \frac{4}{\pi} \tan^{-1}\left( \frac{v[(i+k+1) \bmod (N+1)]}{v[k]} \right) \; i = 0, \ldots, N$$

Other functions other than the arctangent are possible. Any coordinate transformation function that reduces the distortion of the mapping due to the flatness of the cube's faces may be used. Essentially, the function should virtually bend the flat faces of the wrapping cube so that a given number of bits corresponds to almost the same quantization error anywhere on the underlying sphere. Moreover, although other functions in the form a*tan$^{-1}$ (b*c) are possible, where c=v[(i+k+1) mod (N+1)]/v[k], as above, the added complexity of these forms increase the encoding and decoding times. Although some values such as b=0.7 give a slight increase in compression, where speed is a controlling factor, a and b are set to 1.0.

The entire quantization process, however, is controlled by the number of bits, QuantNbBits, used to represent the encoded normals or rotations. When encoding, if QuantNbBits=0, the encoding process is trivial since vq[i]=0 for each i, and the values need not be coded or written at all—i.e., the values are "virtually" coded using zero bits.

Otherwise, each component of $V_c$ (which lies between $-1$ and 1) is quantized as a signed integer as follows:

$$vq[i]=\text{Round}(v_c[i]*2^{QuantNBbits-1})$$

where Roundo returns the integer part of $v_c[i]$. Having calculated the components $v_c$, the components are encoded into a face index and a location on the face. The face index is encoded as an orientation (a 2-bit, unsigned integer) and, for normals only, a direction (a 1-bit, unsigned integer (e.g., where 0 is used as $-1$ and 1 is used as 1)). The components themselves are then coded as unsigned or signed integers on QuantNbBits according to:

$$2^{QuantNbBits-1}+vq[i].$$

That is, each normal is encoded in a number of bits given by:

bits=1 (direction)+2 (orientation)+2* QuantNbBits, or, more specifically when QuantNbBits=3, as in the example, then:

bits 1 (direction)+2 (orientation)+2*3 (i.e., QuantNbBits)=9.

For rotations, the direction bit is omitted, and the number of bits for encoding is given by:

bits=2 (orientation)+3 * QuantNbBits, or, more specifically when QuantNbBits=3, as in the example, then:

bits=2 (orientation)+3 * 3(i.e., QuantNbBits)=11.

The decoding process works in reverse, using the same number of bits to decode the face index (including the direction and orientation). The components themselves are decoded back into signed values according to:

$$vq'[i]=v_{decoded}-2^{QuantNnbBits-1}$$

Having converted the encoded values back into decoded values, the quantization process must be undone through an inverse quantization process. As described above, if QuantNbBits is zero, the coding process was trivial and did not actually write any bits, so the decoding process is similarly trivial and does not read any bits, and $v_c[i]$ is set to 0. However, when QuantNbBits is non-zero, the inverse quantization process is performed according to:

$$v'_c[i] = \frac{vq'[i]}{2^{QuantNbBits-1}}$$

After extracting the orientation, k, and the direction, dir, the inverse mapping can be performed according to:

$$v'[k] = \text{dir} \cdot \frac{1}{\sqrt{1+\sum_{i=0}^{i<N}\tan^2\pi \cdot \frac{v'_c[i]}{4}}}$$

$$v'[(i+k+1)\text{mod}(N+1)] = \tan\left(\frac{\pi \cdot v'_c[i]}{4}\right) \cdot v'[k] \quad i=0, \ldots, N$$

If the object is a rotation, v' can be either used directly or converted back from a quaternion to a Rotation (axis $\rho$, $n$, angle $\alpha$):

$$\alpha = 2 \cdot \cos^{-1}(v'[0]) \quad n_x = \frac{v'[1]}{\sin(\alpha/2)} \quad n_y = \frac{v'[2]}{\sin(\alpha/2)} \quad n_z = \frac{v'[3]}{\sin(\alpha/2)}$$

If the object is a normal, v' can be used directly as the components of the decoded normal.

The ability to encode and decode, however, is only a means to an end. The overall process of the present invention enables efficient compensation for motion. Accordingly, a difference between two reasonably close quantized values provides increased compression. Although the compensation process is fully specified with the integer QuantNbBits defined in the quantization process, in order to code the values output by the process, the following parameters have to be defined:

CompMin: An array of integers that define the minimum bounds of the compensation vector vDelta.

Com NbBits: An integer that defines the number of bits used to represent the components of the compensation vector.

Each component vDelta[i] is translated by CompMin[i] and coded on CompNbBits. Thus, the actual coded value is then: vDelta[i]—CompMin[i], and the encoding process defines how to compute the compensation vector vDelta between the quantized normals or rotations vq1 and vq2.

Similar to the encoding of the face index in the quantization process, in the compensation process, the parameters, vq1 and vq2 are defined by respective orientations and directions, referenced as (1) ori1 and dir1 and (2) ori2 and dir2, respectively for vq1 and vq2. All of ori1, dirn, ori2, and dir2 are integers. In addition, vq1 and vq2 both include a respective array of quantized integer components that are stored in corresponding arrays vq1 [] and vq2 [].

Based on vq1 and vq2, the direction of the a compensation vector vDelta is calculated as $-1$ or 1 (although for rotations the value is ignored), and is referred to as an integer inverse. Then a set of compensation components is calculated and stored in an array of integers vDelta[]. The values in vDelta are obtained according to method described below.

Let the number of reduced components be N, where N=2 for normals and N=3 for rotations. Initially the variable inv=1. Then the differential orientation, dOri, and direction, dDir, between vq1 and vq2 are computed according to:

dOri=(ori2−ori1) mod (N+1)

dDir=dir1*dir2 scale=max(½, $2^{QuantNbBits-1}$−1)

That is, the scale represents the maximum value represented on a face of the cube based on the number of bits used in quantization. However, 0 and 1 bit(s) are special cases for QuanlNbBit s. In the case of 0 and 1 bit(s), only the centers of the faces on the cube can be represented. Thus, coding with 0 bits plus the direction and orientation bits is more efficient than coding with 1 I bit since 0 bits uses less space and allows coding of the same information. Moreover, the preferred embodiment of the present invention utilizes odd values for the limits of each face in order to ensure that zero can be correctly represented on each face. Although representing face values in this fashion elaves one value (e.g., −128 when QuantNbBits=8) unused, it is preferrable to accurately represent pure directions at the expense of less efficient coding. In fact, to compensate for lower coding efficencies in general, additional layers of coding (e.g., Huffinan coding) can be used on top. However, in the preferred embodiment, no additional coding is applied to recover the lost one bit since the added complexity is not offset by a significant enough gain.

Then, depending on the differential orientation, dOri, each of the following two cases are considered separately.

| | |
|---|---|
| dOri = 0 | vDelta is defined by: |
| | vDelta[i] = vq2[i] − vq1[i] |
| dOri ≠ 0 | Let dist = vq2[N-dOri] + vq1[dOri−1] |
| | if dist < 0 then inv = −1 |
| | vDelta is then defined by: |
| | 0 ≤ i < dOri − 1    vDelta[i]= inv*vq2[i − dOri − 1] − vq[i] |
| | i = dOri − 1    vDelta[i]= inv*2*scale − dist |
| | dOri ≤ i < N    vDelta[i]= inv*vq2[i − dOri] − vq1[i] |

Since the variable inv may have changed during the calculation, the variable inverse is calculated after the fact according to: inverse=inv*dDir.

Sometimes there are two ways to represent the same rotation, depending on the face from which the projected point is seen. However, this marginal non-injectivity in the quantization process may not yield exactly vq2 when vq1 is compensated by vDelta to create vq2'. However, vq2 and vq2' will always represent the same normal or rotation.

Having calculated the compensation, the compensation must be encoded as done during quantization. For normals only, the inverse is coded on a single bit. The compensation vector's components are then translated by −CompMin and coded on CompNbBits according to:

$$V_{encoded} = vDelta[i] - CompMin[i]$$

The encoding process is then reversed, and the compensation vectors are decoded. The decoding process transforms the normal or rotation vq1 by the compensation vector vDelta to yield the quantized normal or rotation vq2. For normals only, the single bit inversion is decoded. Then, the compensation vector's components are translated by Comp-Min and coded on CompNbBits according to:

$$vDelta[i] = V_{decoded} + CompMin[i]$$

From vDelta, the compensation process can proceed. The initial parameter, vq1, includes (1) an orientation1, (2) a direction1, and (3) a set of quantized components stored in an array of integers vq1 [ ]. Likewise the compensation vector, vDelta, includes (1) an inverse integer labeled "inverse," and set of compensation components stored in an array of integers vDelta []. The output of the compensation process is a quantized parameter vq2, defmed by (1) an orientation, (2) a direction, and (3) a set of quantized components stored in an array, vq2[], of integers. The values of vq2[] are computed. Also, scale is given by:

$$scale = max\ (\tfrac{1}{2},\ 2^{QuantNbBits-1} - 1).$$

Initially an addition is performed component-by-component and stored in a temporary array according to:

$$vqTemp[i] = vq1[i] + vDelta[i].$$

As always, N is the number of reduced components, where N=2 for normals and N=3 for rotations. Based on the initial calculations, flirier processing is performed according to which of the following three cases are true.

| | |
|---|---|
| For every index i, \|vqTemp[i]\| ≤ scale | vq2 is defined by, |
| | vq2 [i] = vqTemp [i] |
| | orientation2 = orientation1 |
| | direction2 = direction1 * inverse |
| There is one and only one index k such that \|vqTemp[k]\| > scale | vq2 is rescaled as if gliding on the faces of the mapping cube. |
| | Let inv = 1 if vqTemp [k] > = 0, and −1 else |
| | Let dOri = k + 1 |
| | The components of vq2 are computed as follows |
| | 0 ≤ i < N − dOri    vq2[i] = inv*vqTemp[(i + dOri) mod N] |
| | i = N − dOri      vq2[i] = inv*2*scale − vqTemp[dOri − 1] |
| | N − dOri < i < N    vq2[i] = inv*vqTemp[(i + dOri − 1) mod N] |
| | orientation2 = (orientation1 + dOri) mod(N + 1) |
| | direction2 = direction1 * inverse * inv |
| There are several indices k such that \|vqTemp[k]\| > scale | The result is undefined. This means the encoding process should not let this case happen, but a backup strategy could easily be designed for the decoder. |

Figure 5:
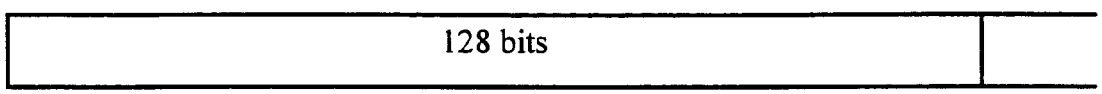
FIG. 5 is an illustration of the difference between previous encodings and the encoding according to the present invention.
Figure 5:
Figure 5:
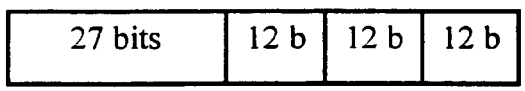

Accordingly, the present invention enables normals and rotations to be coded more efficiently. The method applied to rotations and normals is uniform, which enables an optimal system to be built for scene encoding. It is believed that the prediction/compensation process described herein combined with an appropriate quantization and entropy coding will enable a reduction in data size for video streams, as shown graphically in FIG. 5. Such a reduction is expected to be by a factor of 15 or more in light of a quantization reduction of about 5:1 and a compensation reduction of about another 2:1 to 3:1 from the quantized state.

As shown in Table 1 below, the compression of rotations and normals according to the present invention can provide significant compression of scenes as compared to VRML ASCII files representing substantially similar video streams.

TABLE 1

| File | Vrml Animation File size (kB) | Fraction of rotations and normals | BIFS Anim July 98 Draft File size (kB) | BIFS Anim With Rotation Normal Compensation File size (kB) | BIFS Anim With Rotation Normal Compensation ratio | Specific compression gain |
|---|---|---|---|---|---|---|
| Intro | 730 | 50% | 45 | 30 | 24.3 | +100% |
| Prolog | 672 | 50% | 80 | 54 | 12.4 | +97% |
| Movie1 | 1402 | 50% | 125 | 84 | 16.7 | +98% |
| Finale | 126 | 60% | 9 | 5.3 | 23.8 | +115% |
| Movie2 | 111 | 50% | 9.5 | 6.3 | 17.6 | +100% |
| Skeleton | 38 | 50% | 4 | 2.5 | 15.2 | +120% |

As would be evident to one of ordinary skill in the art, the method and system may be practised other than explicitly set forth herein without departing from the spirit of the invention. Therefore, the specification is not intended to be limiting, and only the scope of the claims defines the limits of the invention.

What is claimed is:

1. A computer-implemented method of encoding a video stream, the method comprising the steps of:
   (a) calculating an original vector representing one of a normal and a rotation;
   (b) calculating a normalized vector from the original vector;
   (c) projecting the normalized vector onto a unit cube to produce a first point on a first face of the unit cube; and
   (d) encoding a video stream using an index of the first face and a location of the first point on the first face.

2. The computer-implemented method according to claim 1, further comprising the steps of:
   (e) calculating a motion vector based on motion, along the unit cube, between the first point on the first face and a second point on a second face; and
   (f) encoding the video stream using the motion vector.

3. The computer-implemented method according to claim 2, wherein the first and second faces are the same face on the unit cube.

4. The computer-implemented method according to claim 2, wherein the first and second faces are different faces on the unit cube.

5. The computer-implemented method according to claim 2, further comprising the step of decoding the video stream by receiving the motion vector and calculating a corresponding one of a normal and a rotation.

6. The computer-implemented method according to claim 1, further comprising the step of decoding the video stream by receiving the index of the first face and the first point and converting back to the one of a normal and a rotation.

* * * * *

UNITED STATES PATENT AND TRADEMARK OFFICE
CERTIFICATE OF CORRECTION

PATENT NO.    : 6,204,854 B1
DATED         : March 20, 2001
INVENTOR(S)   : Julien Signes et al.

It is certified that error appears in the above-identified patent and that said Letters Patent is hereby corrected as shown below:

Column 3,
Line 38, change "quatemions" to -- quaternions --;
Line 52, change "comers" to -- corners --.

Column 4,
Line 36, change "quatemions" to -- quaternions --.

Column 5,
Line 1, change "$V_c$" to -- $v_c$ --;
Line 5, change "Roundo" to -- Round() --.

Column 6,
Line 25, change "Com NbBits" to -- CompNbBits --;
Line 37, change "dirn" to -- dir1 --;
Line 59, change "QuanlNbBit s" to -- QuantNbBits --;
Line 61, insert -- ( -- before "plus" and insert -- ) -- after "bits"
Line 62, change "I" to -- [I] --.

Column 7,
Line 15, change "Letdist" to -- Let dist --;
Line 16, change "ifdist" to -- if dist --;
Line 18, change "$\leqq$" to -- $\leq$ --;
Line 20, change "$\leqq$" to -- $\leq$ --;
Line 25, delete "Sometimes" and change "there" to -- There --.

UNITED STATES PATENT AND TRADEMARK OFFICE
CERTIFICATE OF CORRECTION

PATENT NO. : 6,204,854 B1
DATED : March 20, 2001
INVENTOR(S) : Julien Signes et al.

It is certified that error appears in the above-identified patent and that said Letters Patent is hereby corrected as shown below:

<u>Column 8,</u>
Line 1, change "V" to -- v --;
Line 11, change "defmed" to -- defined --;
Line 27, change "flirier" to -- further --;
Line 30, change "$\underline{\leq}$" to -- $\leq$ --;
Line 39, change "$\underline{\leq}$" to -- $\leq$ --.

Signed and Sealed this

Twentieth Day of November, 2001

*Attest:*

*Nicholas P. Godici*

*Attesting Officer*

NICHOLAS P. GODICI
*Acting Director of the United States Patent and Trademark Office*